(12) United States Patent
Mattheij et al.

(10) Patent No.: US 11,274,561 B2
(45) Date of Patent: Mar. 15, 2022

(54) ASSEMBLY OF VANE UNITS

(71) Applicant: SULZER TURBO SERVICES VENLO B.V., AD Venlo (NL)

(72) Inventors: Jozef H. G. Mattheij, AH Roerdalen (NL); Twan Antonius Martinus Althuizen, Eindhoven (NL)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 16/645,013

(22) PCT Filed: Sep. 17, 2018

(86) PCT No.: PCT/EP2018/075018
§ 371 (c)(1),
(2) Date: Mar. 6, 2020

(87) PCT Pub. No.: WO2019/057655
PCT Pub. Date: Mar. 28, 2019

(65) Prior Publication Data
US 2020/0256199 A1      Aug. 13, 2020

(30) Foreign Application Priority Data

Sep. 20, 2017   (EP) .................................... 17192214

(51) Int. Cl.
*F01D 5/24*    (2006.01)
*F01D 9/04*    (2006.01)
*F01D 25/24*   (2006.01)

(52) U.S. Cl.
CPC ............... *F01D 5/24* (2013.01); *F01D 9/042* (2013.01); *F01D 25/246* (2013.01); *F05D 2260/36* (2013.01); *F05D 2260/96* (2013.01)

(58) Field of Classification Search
CPC ..... F01D 5/22; F01D 5/24; F01D 5/26; F01D 9/042; F05D 2260/96; F05D 2220/32;
(Continued)

(56) References Cited

U.S. PATENT DOCUMENTS

| 900,739 A | * | 8/1908 | Jude et al. | ............... F01D 5/225 |
| 1,061,648 A | * | 5/1913 | Westinghouse | ......... F01D 5/225 |
| | | | | 416/191 |

(Continued)

FOREIGN PATENT DOCUMENTS

| CH | 578 679 A5 | 8/1976 |
| DE | 10 2007 059220 A1 | 6/2009 |

(Continued)

OTHER PUBLICATIONS

International Search Report dated Nov. 6, 2018 in corresponding International Application No. PCT/EP2018/075018, filed Sep. 17, 2018.

*Primary Examiner* — David E Sosnowski
*Assistant Examiner* — Maxime M Adjagbe
(74) *Attorney, Agent, or Firm* — Global IP Counselors, LLP (57) ABSTRACT

A vane assembly includes a plurality of vane units and a connecting part. Each vane unit includes a base having a through-hole positioned between opposing longitudinal faces of the base. The connecting part includes a lacing bar that is insertable into and through the through-holes for coupling at least two adjacent vane units into the vane assembly. In the vane assembly the connecting part is arranged through the through holes of the plurality of vane units clamping the vane units on the lacing bar.

14 Claims, 5 Drawing Sheets

(58) Field of Classification Search
CPC ............ F05D 2230/60; F05D 2230/64; F05D 2240/10; F05D 2240/12
See application file for complete search history.

(56) References Cited

U.S. PATENT DOCUMENTS

| | | |
|---|---|---|
| 7,984,548 B2 | 7/2011 | Anderson et al. |
| 2011/0002787 A1 | 1/2011 | Castro et al. |
| 2012/0087798 A1* | 4/2012 | Roman-Morales ..... F01D 5/326 |
| | | 416/220 R |

FOREIGN PATENT DOCUMENTS

| | | |
|---|---|---|
| EP | 2 187 062 A1 | 5/2010 |
| EP | 2 604 812 A1 | 6/2013 |
| FI | 960920 A | 8/1997 |
| FR | 910154 A | 5/1946 |
| FR | 69 842 E | 12/1958 |
| JP | S5996301 U | 6/1984 |

\* cited by examiner

ASSEMBLY OF VANE UNITS

CROSS-REFERENCE TO RELATED APPLICATION

This application is a U.S. National Stage application of International Application No. PCT/EP2018/075018, filed Sep. 17, 2018, which claims priority to European Patent Application No. 17192214.9, filed Sep. 20, 2017, the contents of each of which are hereby incorporated herein by reference.

BACKGROUND

Field of the Invention

The invention relates to compressor stator vane units and a method of assembling vane units in a casing of the compressor.

Background Information

Figure 1:
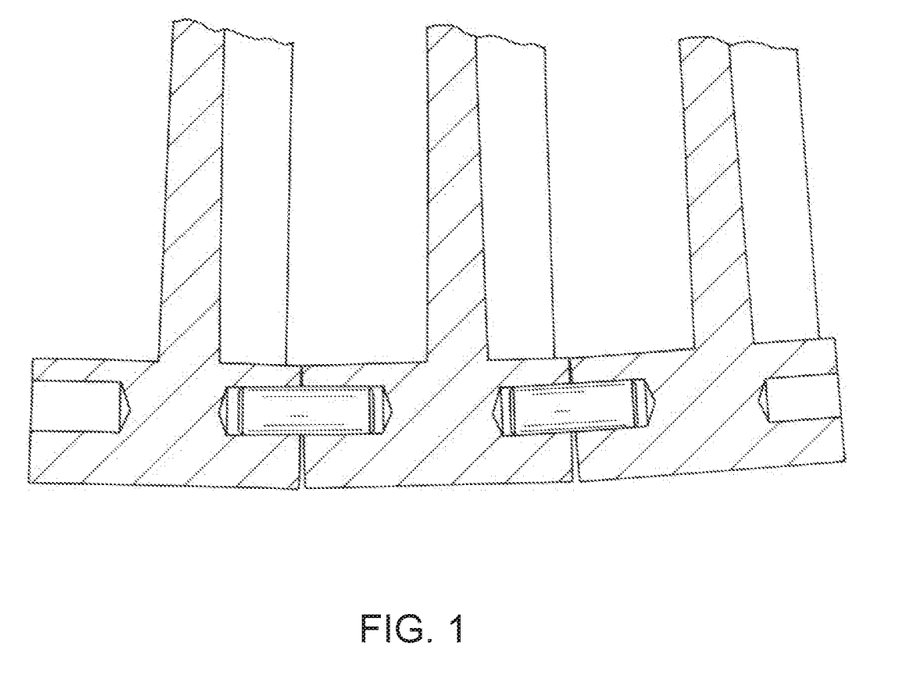
FIG. 1 is a cross section of a prior art vane unit assembly.

A conventional compressor stator vane unit can include a base for engaging a (semi-circle) slot in a compressor casing and an airfoil extending from the base for cooperating with airfoils of blade units on the compressor rotor. Engagement of the vane unit with the casing slot conventionally is achieved through protrusions extending from transversal faces of the base which cooperate with longitudinal grooves in side walls of the slot. A plurality of vane units may be slid into the slot for forming a stage of the compressor. To minimize relative motion, wear, and chatter of the vane units and slot, U.S. Pat. No. 7,984,548 teaches providing (i) blind-holes in longitudinal faces of the bases such that the blind-holes are aligned along their axes, and (ii) pins for assembling into two blind-holes in the bases of adjacent vane units in a stage thus connecting the two vane units (see FIG. 1).

SUMMARY

All vane units in a stage can so be connected through the pins to form a vane ring, or at least halve a ring in a first halve of the casing. It has been found that one disadvantage of the prior art method is that the robustness of the vane ring is not very controllable. For instance, the tightness of the fit between adjacent vane units in the vane ring can vary, resulting in sub-optimal damping characteristics and thus in wear and chatter over time.

To overcome this technical problem, the invention provides, according to a first aspect, a vane assembly comprising a plurality of vane units and a connecting part, wherein each vane unit comprises a base having a through-hole positioned between opposing longitudinal faces of the base, wherein the connecting part comprises a lacing bar formed such that it is insertable into and through the through-holes for coupling at least two, preferably at least three, adjacent vane units into the vane assembly, and wherein in the vane assembly the connecting part is arranged through the through holes of the plurality of vane units such that the vane units are clamped on the lacing bar. Advantageously, the invention overcomes the variability in fitting the vane units in a vane ring, thus providing a more robust ring with improved damping characteristics. More in particular, the invention enables clamping the individual vane nits on a single shared connecting part, the lacing bar, which thus functions as the robust back bone of the assembly.

In one embodiment, in the assembly, the through-holes of adjacent vane units together form a cavity, wherein the cavity and the lacing bar have distinct/dissimilar arcuate shapes (i.e. have different radii of curvature) for providing a predefined tension in a vane assembly. Advantageously, the dissimilar arcuate form factors of the cavity formed by the through-holes and the lacing bar enable the vane assembly to be constructed with a predefined and reproducible tension causing the vane units to be clamped on the lacing bar. As all units in the assembly are similarly clamped to a single shared back bone, the variability present in the prior art solution is drastically diminished. This reduced variability improves the damping characteristics and thus minimizes wear of the vane units. Advantageously, the cross section of the lacing bar can be dimensioned to create a predefined spring force when it is inserted in the assembled units. Moreover, the lacing bar—in contrast to the pin of the prior art—will be elastically deformed through bending upon insertion into and through the through-holes, thus providing the tension for reproducibly interconnecting the vane units in the assembly.

In one embodiment, the through-holes in adjacent vane units within the assembly are straight and together form a polygonal cavity in, respectively through, which the lacing bar is insertable. Advantageously, in case of vane units with a rectangular base this overcomes the difficulty of machining the prior art blind-holes which are angled relative to the longitudinal base faces to accommodate the curvature of the casing slot. More sophisticated vane unit bases are trapezoidal allowing abutting the longitudinal base faces of adjacent units in the assembly, and (optionally) have adapted bottom faces congruent with the slot curvature.

In one embodiment, the lacing bar comprises a predefined arcuate shape for providing a predefined tension in a vane assembly. Advantageously, the predefined arcuate shape of the lacing bar enables providing a predefined and reproducible tension. Moreover, the arcuate shape of the lacing bar enables easy and convenient assembly of vane units positioned in the slot and the lacing bar into a vane assembly.

In one embodiment, the arcuate shape of the lacing bar comprises a radius of curvature $R_L$ which deviates 0%-60% from an average radius of curvature of the through-holes (e.g. the polygonal cavity), preferably 10%-50%, more preferably 20% to 40%. Advantageously, once assembled in the through-holes of the vane units and given the difference in radius of curvature $R_L$ of the lacing bar and polygonal cavity, the elasticity of the lacing bar provides the predefined tension in the vane assembly for clamping the vane units to the lacing bar. Moreover, this enables the vane units in the vane assembly to be pushed tight with their base protrusions into the longitudinal grooves in the slot side walls. Consequently, this improves the damping characteristics of the vane assembly and minimizes wear.

In one embodiment, the lacing bar has a length corresponding to the length of a slot in the (half-) casing of a compressor. Such a lacing bar length enables connecting the vane units of (half) a vane ring into a single assembly. Advantageously, this enables forming a single assembly from all, or half, the vane units of a vane ring. The single assembly can be fitted in a casing slot in a well-controlled fashion improving the damping characteristics and thus minimizing wear.

In one embodiment, the lacing bar comprises a plurality of lacing bar components. Advantageously, this enables advanced options to define the desired tension and adjust it to the specifics of the compressor specifications. Consequently, this improves the compressor specific damping characteristics of the vane assembly and minimizes wear.

In one embodiment, the lacing bar components have end sections enabling engagement with a second lacing bar component to form a combined vane assembly from a first and second vane assembly. Advantageously, multiple lacing bars can be used to assemble a plurality of vane assemblies into a vane ring, enabling easier mounting by maintenance staff.

In one embodiment, the end sections are selected from the group consisting of (i) slot & tongue end sections, (ii) hole & plug end sections, (iii) overlapping end sections, (iv) oblique end sections, and (v) flat end sections. Advantageously, the shape of the end sections is designed to promote contact between a first and second lacing bar component for improving the damping characteristics of a combined vane assembly. The interconnecting end sections are especially advantageous at the split line of two half-casings of an axial gas turbine compressor to engage and interlock the vane assemblies in each half to form a single integrated vane ring building a stage of the compressor.

In one embodiment, in cross-section the lacing bar and/or the lacing bar components comprise a plurality of members together forming the lacing bar, respectively the lacing bar component. Advantageously, the members enable advanced options to define the desired tension and adjust it to the specifics of the compressor specifications.

In one embodiment, each vane unit base comprises a plurality of through holes positioned between its longitudinal faces, and the vane assembly comprises a plurality of lacing bars, each lacing bar arranged in the assembly through a corresponding through hole of the plurality of through holes, for creating a predefined tension. Advantageously, this allows each vane unit to be clamped to more than one lacing bar (such as two, three, or four) further reducing the variability in connecting the vane units to a single robust assembly. Moreover, this enables the vane units in the vane assembly to be pushed tight with their base protrusions into the semi-circular longitudinal grooves in the slot side walls. Consequently, incorporating a plurality of lacing bars improves the damping characteristics of the vane assembly and minimizes wear.

In one embodiment, the through-holes in the vane unit bases comprise a bushing or lining. Advantageously, the bushing and lining inside the through-hole improve the damping and wear characteristics of the assembly.

According to another aspect, the invention provides a method for assembling a vane assembly comprising the steps of providing a plurality of vane units, wherein each vane units comprises a base having a through-hole positioned between opposing longitudinal faces of the base, inserting a lacing bar through the through-holes of two adjacent vane units for coupling the two, preferably at least three, adjacent vane units into the vane assembly.

According to yet another aspect, the invention provides a vane assembly comprising a plurality of vane units and a connecting part, wherein each vane unit comprises a base having a through-hole positioned between the opposing longitudinal faces of the base, wherein in the vane assembly the connecting part is arranged through the through holes of the plurality of vane units, wherein the connecting part comprises a lacing bar, and wherein the lacing bar and through holes are arranged such that the lacing bar is elastically deformed through bending when inserted into and through the through-holes.

BRIEF DESCRIPTION OF THE DRAWINGS

The invention will be explained in more detail hereinafter with reference to the drawings.

DETAILED DESCRIPTION OF THE EMBODIMENTS

Those skilled in the art will appreciate that elements in the drawings are illustrated for simplicity and clarity and have not necessarily been drawn to scale. For example, the dimensions of some of the elements in the drawings may be exaggerated relative to other elements to help improve understanding of the various embodiments of the invention. Furthermore, the terms "first", "second", and the like herein, if any, are used inter alia for distinguishing between similar elements and not necessarily for describing a sequential or chronological order. Moreover, the terms "front", "back", "top", "bottom", "up", "down", "over", "under", "proximal", "distal", and the like in the description and/or in the claims, if any, are generally employed for descriptive purposes and not necessarily for comprehensively describing exclusive relative position. Also, the term "engagement feature" may also constitute a "disengagement feature". Skilled artisans will therefore understand that any of the preceding terms so used may be interchanged under appropriate circumstances such that various embodiments of the invention described herein, for example, are capable of operation in other configurations and/or orientations than those explicitly illustrated or otherwise described.

Figure 2A:
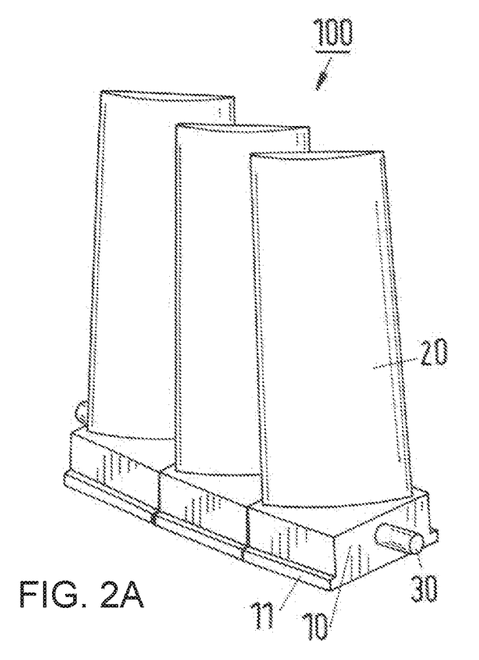
FIGS. 2A-2D are perspective views of different embodiments of a vane assembly according to the invention.
Figure 2B:
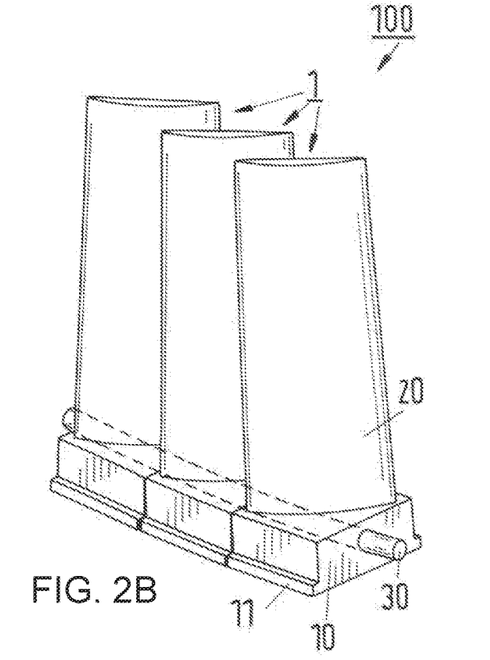
Figure 2C:
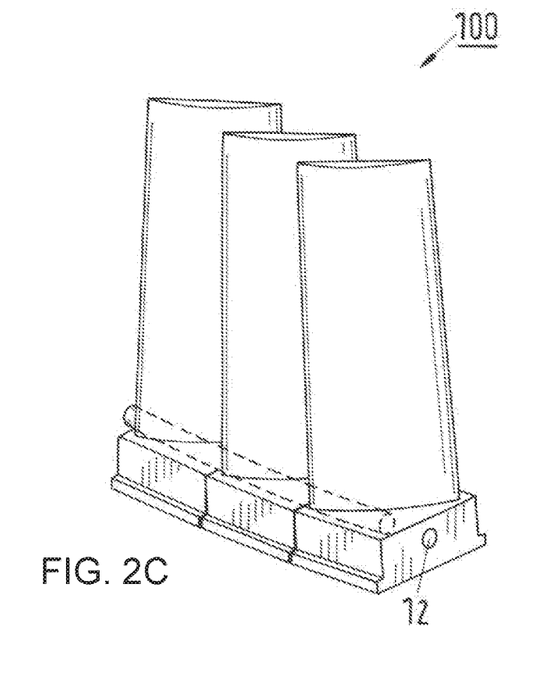
Figure 2D:
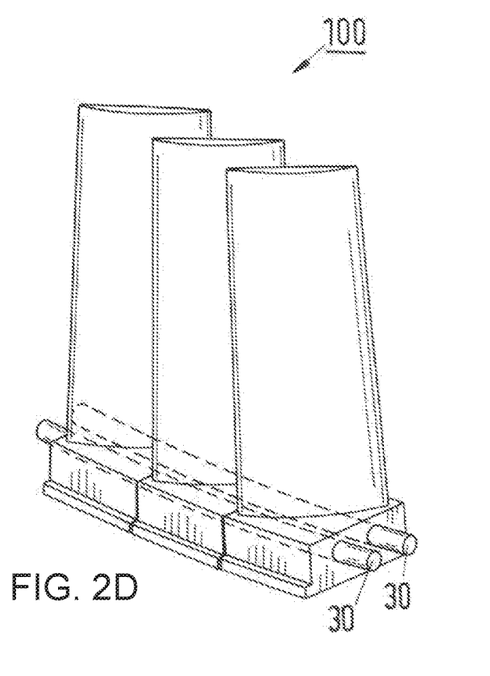

Referring to FIGS. 2A-2D, perspective views of a vane assembly 100 according to the invention for use in axial gas turbine compressors are shown. FIG. 2A shows a vane assembly comprising three vane units 1 connected with a lacing bar 30. Each vane unit 1 has a base 10 and an airfoil 20 extending from it for cooperating with airfoils of a blade unit on a compressor rotor. The vane unit bases have bottom faces for engaging the casing slot. Protrusions 11 extend from transversal faces of base 1 for engagement with a cooperating groove in a side wall of a casing slot (not shown) into which the vane units 1 are to be positioned. Between longitudinal faces of base 1, through-holes 12 may be machined or cast for engagement with a lacing bar 30. As shown in FIGS. 2B and 2C, lacing bar 30 may be inserted into and through a through-hole 12 of base 10. A vane assembly 100 may be formed by lacing a plurality, such as two, three, four, or more, vane units 10 together through inserting a lacing bar 30 into and through the respective through-holes. FIG. 2D shows the possibility of providing a plurality of through-holes 12 (here two) in a vane unit base 10 for connecting the vane units 1 into a vane assembly 100. Each of the plurality of through holes is positioned between the two opposing longitudinal faces of base 10. In this embodiment a plurality of lacing bars 30, such as two, three, or four, can be inserted into respective through holes. Advantageously, lacing the vane units 1 together into assembly 100 using a lacing bar 30 overcomes the variability in fitting the vane units in a vane ring, thus providing a more robust ring with improved damping characteristics.

Figure 3A:
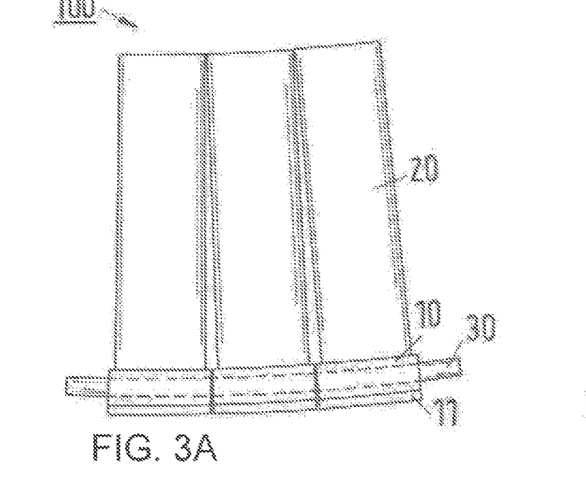
FIGS. 3A-3C are side views and cross section of an embodiment of a vane assembly according to the invention.
Figure 3B:
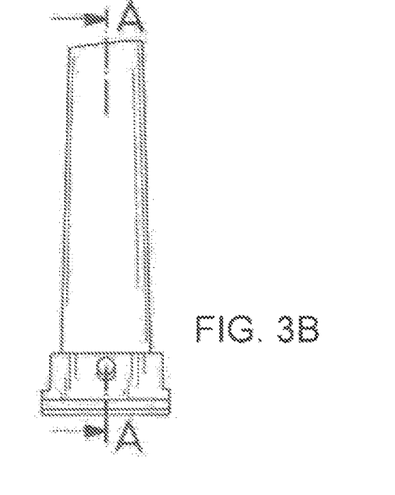
Figure 3C:
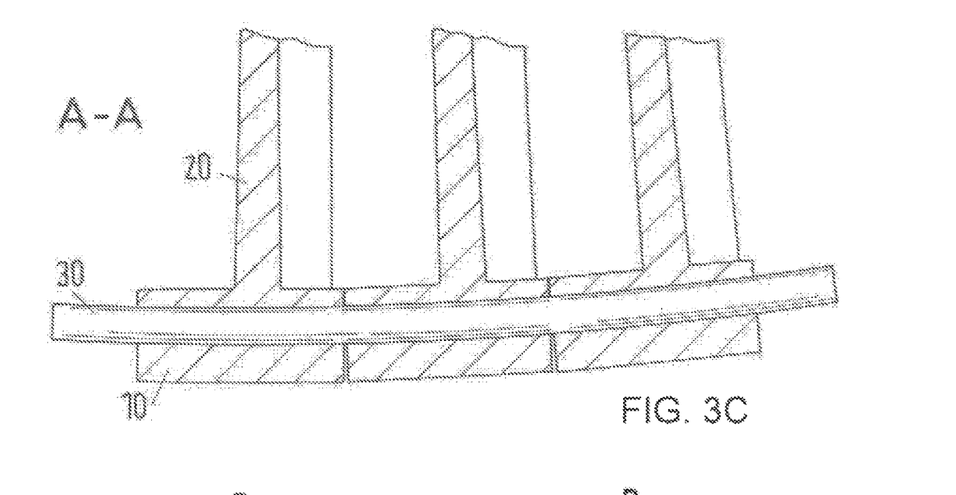

FIGS. 3A-3C provide side views of assembly 100 from a transversal (FIG. 3A) and longitudinal (FIG. 3B) perspective. FIG. 3C provides a cross sectional view along the line A-A of FIG. 3B. As the compressor casing of gas turbines usually comprises two semi-circular portions that are fitted together to encircle the rotor, the stator vanes units are assembled in vane ring segments for forming the stages of the compressor. A semi-circular slot in the two casing portions is arranged for engaging with the vane bases 10, such that the airfoils 20 extend radially inward towards the shaft of the compressor rotor. The vane units are thus positioned on a semi-circle as is indicated in FIG. 3C with the slight curvature of the bases 10 in vane assembly 100. Lacing bar 30 has an arcuate shape too, for easy assembly into the through-holes of the plurality of vane units 1 in assembly 100.

Vane unit bases 10 may be machined or cast in a rectangular form. This however results in an inferior matching of adjacent vane units 1 and of the vane units and the casing slot. Hence, preferably, the vane units 1 may be formed trapezoidal to match the longitudinal faces of adjacent vane units 1. Moreover, the units may have adapted bottom faces congruent with the slot curvature.

Figure 4:
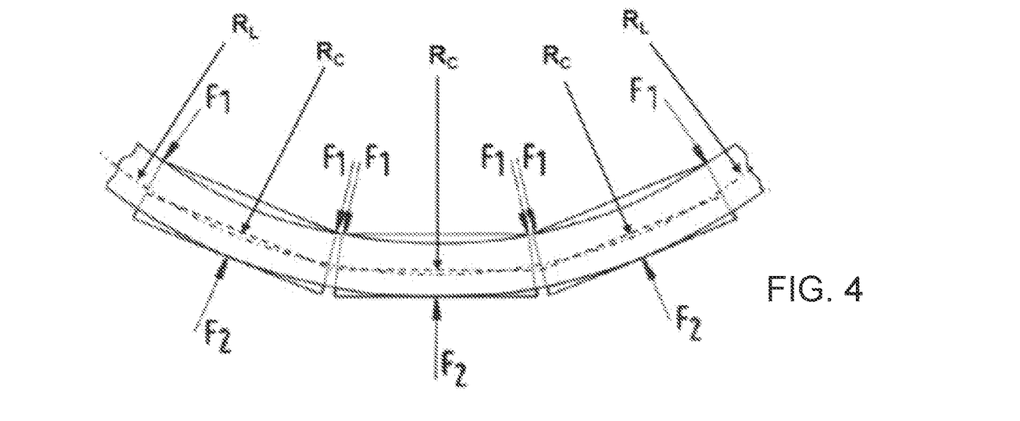
FIG. 4 is a schematic view of the lacing bar inserted into the polygonal cavity formed by the through holes.

The through-holes 12 in the vane bases 10 together form a cavity when the vane units 1 are positioned adjacent to each other in assembly 100 in the semi-circular slot. Consequently, the cavity has an arcuate shape. Preferably the cavity has an arcuate shape distinct from that of lacing bar 30. Thus, the radius of curvature of the arcuate shape of lacing bar 30 may be larger, equal (as long as the arcuate shape is distinct), or smaller than the (average) radius of curvature $R_c$ of the cavity formed by the through holes of a number of adjacent vane units 1. Hence, the arcuate shape of lacing bar 30 may comprises a radius of curvature which deviates 0%-60% from that of the through holes, preferably 20%-50%, more preferably 30% to 40%. Preferably, the radius of curvature $R_L$ of the arcuate shape of lacing bar 30 is smaller. Preferably, the through-holes are straight for easy machining and/or casting. In this later case, the through-holes 12 of adjacent vane units may build a polygonal cavity into which lacing bar 30 is insertable, as can be seen in FIG. 4. The difference between the radius of curvature $R_L$ of the arcuate shape of lacing bar 30 and the average radius of $R_c$ curvature of the polygonal cavity, results in an elastic bending deformation of lacing bar 30, as indicated by the forces $F_1$ and $F_2$ in FIG. 4. The elastically bend lacing bar 30 improves the damping characteristics of the vane assembly. Hence, wear of the vane bases 10 and casing slot is reduced. Advantageously, arranging the lacing bar and the through holes in the respective bases such that the lacing bar is elastically deformed, respectively bend, when inserted into and through the through-holes causes each individual vane unit to be clamped onto the lacing bar.

The forces $F_1$ and $F_2$ can be chosen in accordance with the specification of the compressor. The tension provided by lacing bar 30 can be dimensioned by selecting, amongst others, an appropriate difference in radius of curvature, material, cross-sectional size and form factor, and/or configuration of lacing bar 30. Thus, preferably all parts and features of the vane assembly 100 and its components (i.e. vane unit 1, base 10, through hole 12, lacing bar 30) are dimensioned in such way that the curvature of the bottom faces of the combined vane units in the vane assembly closely matches the curvature of the mounting slots in the compressor casing. Advantageously, the vane assembly can then be mounted in the slot without elastic stresses between the assembly and the casing. As a result the internal stresses on the lacing bar 30 remain unchanged and well-defined, and thus the clamped vane units on the lacing bar back bone remain robustly secured. Moreover, inserting the vane assembly in the slot is more convenient for operating personnel.

Figure 5A:
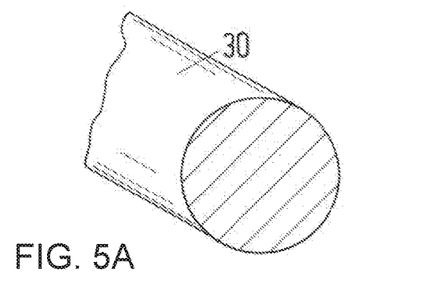
FIGS. 5A-5H are a plurality of embodiments of the lacing bar according to the invention.
Figure 5B:
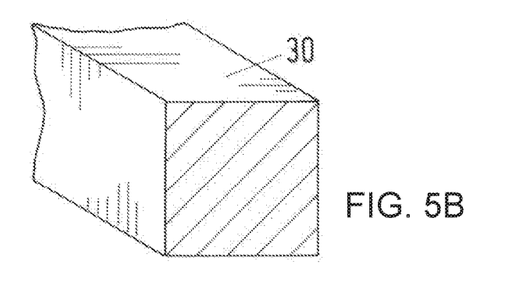
Figure 5C:
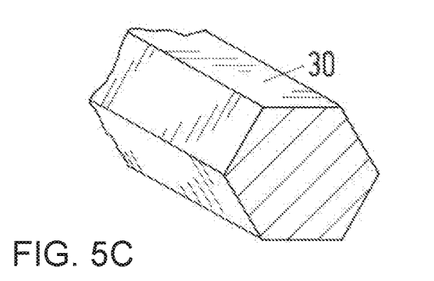
Figure 5D:
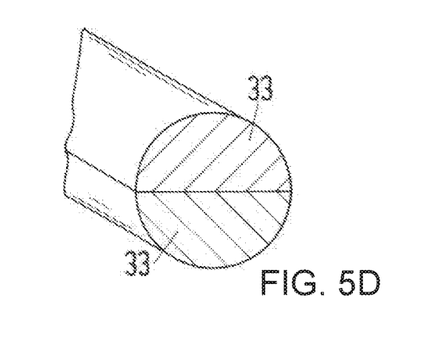
Figure 5E:
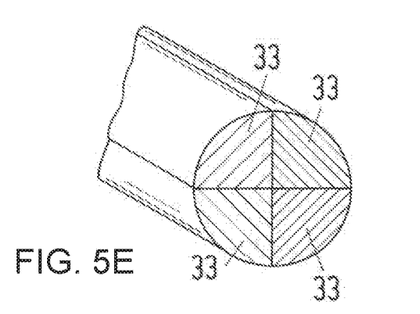
Figure 5F:
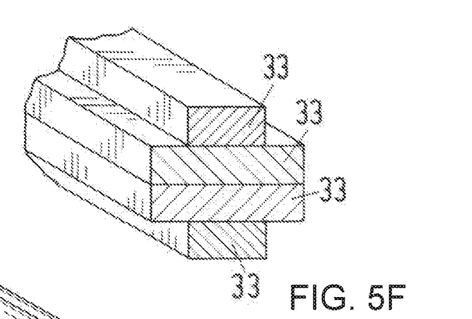

FIGS. 5A-5H show different embodiments of lacing bar 30. As an example, lacing bar 30 may be cylindrical (FIG. 5A), may have a rectangular (FIG. 5B), such as a square, or a polygonal (FIG. 5C & FIG. 5F) cross section, such as a hexagon or cross. Moreover, lacing bar 30 may comprise a plurality of members 33 for tuning the resilient characteristics of the lacing bar. As an example, a cylindrical lacing bar may be formed by two halves (FIG. 5D), four quarters (FIG. 5E) or any number of pie-shaped members. As another example, a cross shaped lacing bar 30 may comprise a plurality of rectangular members (FIG. 5F). To further tune the characteristics of lacing bar 30, and thus the tension and damping achieved in assembly 100, the lacing bar members 33 can comprise different materials. Preferably, the material of lacing bar 30 and/or lacing bar members 33 is chosen from the class of ferritic-martensitic stainless steels, and is close to the composition of the material from which the vane units 1 are manufactured. Alternatively, austenitic stainless steels, duplex steels, or other materials, and combinations thereof, can be used to benefit from different thermal expansion characteristics.

Figure 5G:
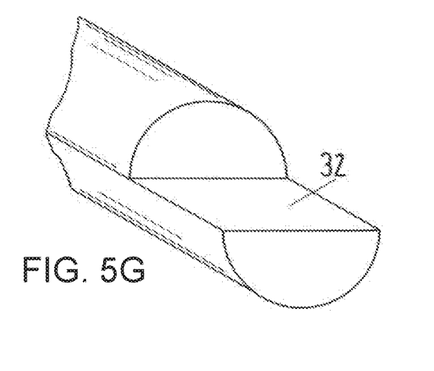
Figure 5H:
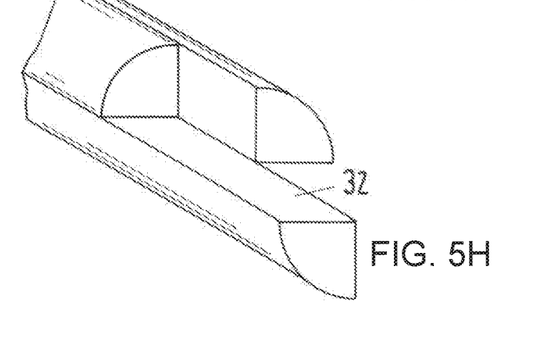
Figure 6A:
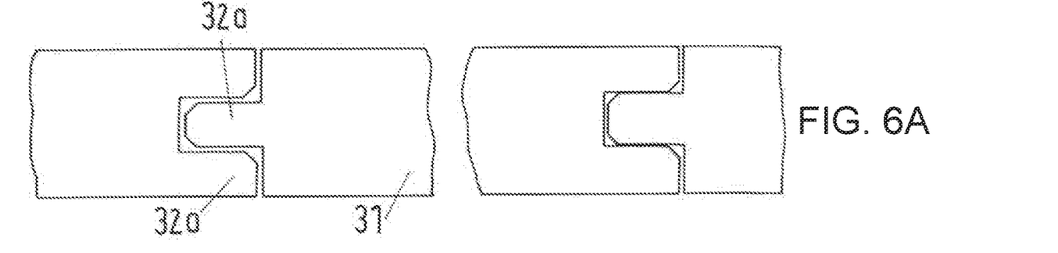
FIGS. 6A-6E are a plurality of embodiments of the lacing bar components showing engagement of their respective end sections.
Figure 6B:
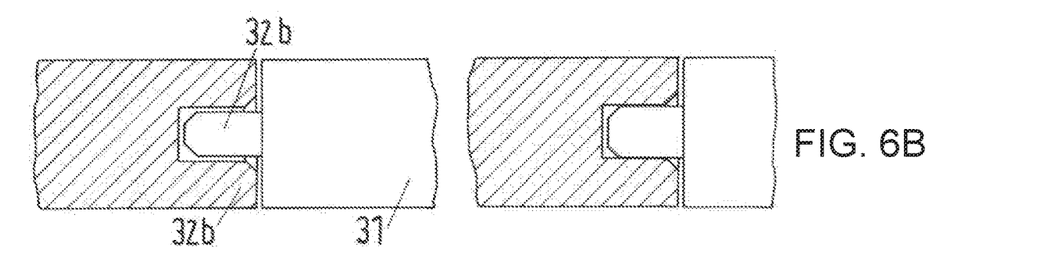
Figure 6C:
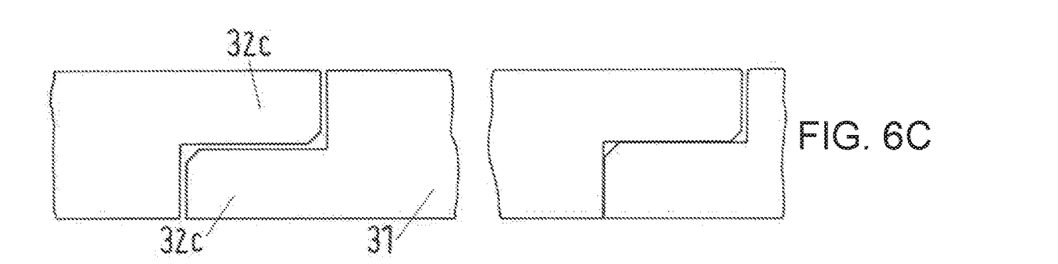
Figure 6D:
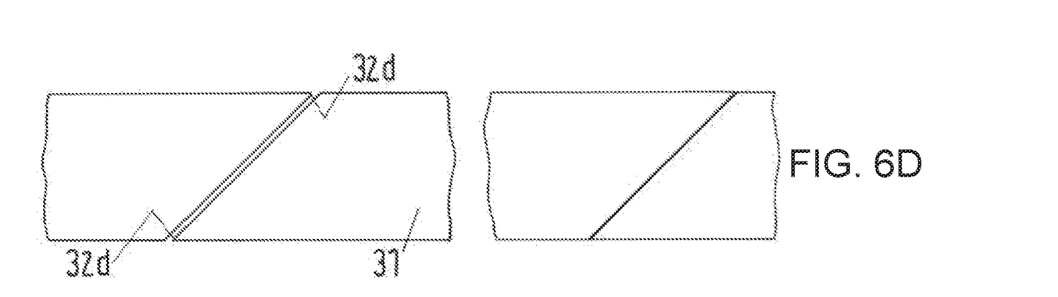
Figure 6E:
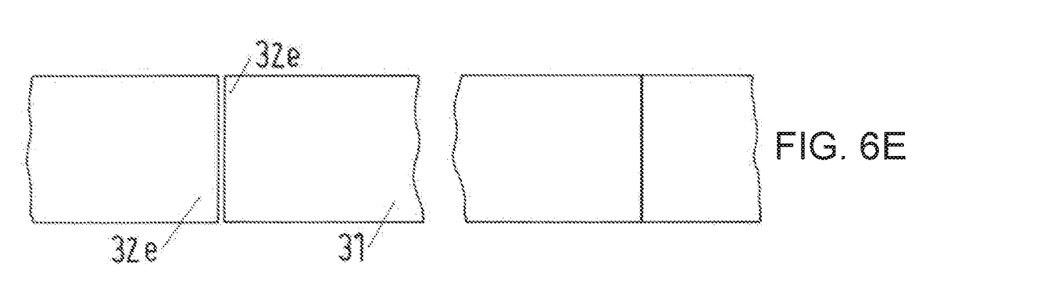

The vane assembly 100 can be assembled with a lacing bar (30) having a length corresponding with a length of the slot in the compressor casing for connecting the vane units (1) of (halve) a vane ring into a single assembly (100). Alternatively, lacing bar 30 can comprise lacing bar components 31 that in lengthwise combination form lacing bar 30. The lacing bar components enable easier insertion into the through holes, especially when the assembly is performed "in the field". In order to maintain the integrity of the damping characteristics of vane assembly 100, the lacing bar components 31 comprise end sections 32 allowing two adjacent components to engage for forming a single assembly 100 from a first and second assembly. To this purpose end sections 32 can be formed such that two adjacent components interlock inside the cavity formed by through-holes 12. Several examples of appropriately formed end sections 32 are depicted in FIGS. 5G & 5H, as well as in FIGS. 6A-6E. The latter figure shows end sections 32 from the type (i) slot & tongue end sections (6A), (ii) hole & plug or pin end sections (6B), (iii) overlapping end sections (FIG. 6C), (iv) oblique end sections (6D), and (v) flat or butt end sections (6E).

Under practical circumstances, lacing bars 30 will preferably connect 3 to 6 vane units 1 into a vane assembly 100. The length of a vane unit is typically between 30 mm and 90 mm. Thus, the length of a lacing bar 30 (or lacing bar component 31) ranges from 90 mm to 540 mm. Alternatively, the lacing bar 30 could extend up to the length of the casing slot, which in dependence of the specification of the compressor ranges between about 1000 mm and about 4000 mm (semi-circle) for casing diameters of utility gas turbines in the range of 600 mm to 2500 mm. The typical diameter for lacing bar 30 ranges between 4 and 14 mm, preferably between 6 and 10 mm. This dimension may be chosen in relation to the actual geometry of the vanes unit bases 10.

Preferably, through-hole 12 can have a circular cross-section and will form a circumferential polygonal cavity in the vane units 1 of vane assembly 100. Alternatively, through-holes 12 can have differently shaped cross-sections, such as a polygonal cross-section. Preferably, lacing bar 30 will have a cross-section congruent with the cross section of through-holes 12. Thus, preferably it has a circular cross-section. It may, however, have other cross sections, for instance polygonal, such as square, rectangular, hexagonal, etc. Optionally, lacing bar 30 or lacing bar components 31 can be composed of one or more members 33, for instance a plurality of pie-shaped members, that fill the desired cross section of the lacing bar or lacing bar component.

Preferably, the tension created by the assembly of the lacing bar 30 into the vane assembly 100 will be in the range of 500 N to 5000 N. The designed tension can be realized through many factors, including but not limited to,
(i) the deviation of the radius of curvature $R_L$ of the arcuate shape of the lacing bar from the average radius of curvature of the (polygonal) cavity in the vane assembly,
(ii) the material choice of the lacing bar,
(iii) the form factor of the lacing bar, such as its cross-section and cross-sectional shape relative to the cross-sectional shape of the through holes,
(iv) the ratio between the lacing bar diameter and the through-hole diameter,
(v) the number and shape of the members in the composition of the lacing bar.

Although the invention has been elucidated with reference to the embodiments described above, it will be evident that alternative embodiments can be used to achieve the same objective. The scope of the invention is therefore not limited to the embodiments described above.

As an example, through-holes 12 can be lined, for example with a bushing or other appropriate lining component or coating. Advantageously, the lining improves the damping and wear characteristics of vane assembly 100, thus improving the effective operational life of the gas turbine compressor in which the invention is implemented.

As yet another embodiment, a vane assembly (100) comprising a vane unit (1) and a lacing bar (30), wherein the vane unit comprises a base (10) having a through-hole (12) positioned between opposing longitudinal faces of the base, wherein the lacing bar is arranged through the through hole, and wherein the lacing bar and through holes are arranged such that the lacing bar is elastically deformed, respectively bend, in an arcuate shape when inserted into and through the through-hole for clamping the vane unit onto the lacing bar

The invention claimed is:
1. A vane assembly comprising:
a plurality of vane units; and
a connecting part,
each vane unit of the plurality of vane units comprising a base having a through-hole extending between opposing longitudinal faces of the base, in the vane assembly, the through-holes of adjacent vane units of the plurality of vane units together form a cavity, the connecting part comprising a lacing bar insertable into and through the through-holes to couple at least two adjacent vane units into the vane assembly, the cavity and the lacing bar having dissimilar longitudinal shapes, and in the vane assembly, the lacing bar is arranged through the through holes of the plurality of vane units such that the vane units are clamped by a force fit on the lacing bar, the through-holes in adjacent vane units of the plurality of vane units being straight, such that the cavity is a circumferential polygonal cavity in which the lacing bar is insertable.
2. The vane assembly according to claim 1, wherein the cavity and the lacing bar have dissimilar arcuate shapes.
3. The vane assembly according to claim 2, wherein the arcuate shape of the lacing bar comprises a radius of curvature which deviates 0%-60% from an average radius of curvature of the cavity formed by the through holes.
4. The vane assembly according to claim 2, wherein the lacing bar has a length to connect the vane units into a single assembly.
5. The vane assembly according to claim 2, wherein the lacing bar comprises a plurality of lacing bar components.
6. The vane assembly according to claim 5, wherein at least a first lacing bar component of the plurality of lacing bar components defines an end section enabling engagement with a second lacing bar component of a lacing bar from a second vane assembly to form a combined vane assembly with the second vane assembly.
7. The vane assembly according to claim 6, wherein the end section is selected from the group consisting of a slot and tongue end section, a hole and plug end section, an overlapping end section, an oblique end section, and a flat end section.
8. The vane assembly according to claim 6, wherein in cross-section, the lacing bar or the lacing bar components comprise a plurality of members.
9. The vane assembly according to claim 2, for each vane unit of the of the plurality of vane units, the through hole in the base is one through hole of a plurality of through holes extending between longitudinal faces of a respective vane unit, and the lacing bar is one of a plurality of lacing bars, each lacing bar arranged in the vane assembly through a corresponding through hole of the plurality of through holes.
10. The vane assembly according to claim 2, wherein the arcuate shape of the lacing bar comprises a radius of curvature which deviates 10%-50% from an average radius of curvature of the cavity formed by the through holes.
11. The vane assembly according to claim 2, wherein the arcuate shape of the lacing bar comprises a radius of curvature which deviates 20% to 40% from an average radius of curvature of the cavity formed by the through holes.
12. The vane assembly according to claim 2, wherein the arcuate shape of the lacing bar comprises a radius of curvature which deviates 0%-60% from an average radius of curvature of the cavity formed by the through holes.
13. A method for assembling a vane assembly comprising:
providing a plurality of vane units, each vane unit of the plurality of vane units comprising a base having a through-hole extending between opposing first and second longitudinal faces of the base;
positioning the vane units such that the first longitudinal face of a first vane unit of the plurality of vane units is adjacent the second longitudinal face of a second vane unit of the plurality of vane units so as to oppose each other and such that the through-holes of the adjacent first and second vane units together form a cavity; and
inserting a lacing bar through the through-holes of the two adjacent first and second vane units to couple the two first and second adjacent vane units into the vane assembly, the through-holes in adjacent vane units of the plurality of vane units being straight, such that the cavity is a circumferential polygonal cavity in which the lacing bar is insertable.
14. A vane assembly comprising:
a plurality of vane units; and
a connecting part comprising a lacing bar,
each vane unit of the plurality of vane units comprising a base having a through-hole extending between opposing longitudinal faces of the base, the through-holes in adjacent vane units of the plurality of vane units being straight, such that a circumferential polygonal cavity is formed in which the lacing bar is insertable, in the vane assembly, the through-holes of adjacent vane units together form the polygonal cavity,     in the vane assembly, the lacing is arranged through the through holes of the adjacent vane units, such that the lacing bar is elastically bent when inserted into and through the through-holes such that the adjacent vane units are clamped by a force-fit on the lacing bar due to the bending forces between lacing bar and through-holes.

\* \* \* \* \*